United States Patent
Yang et al.

(10) Patent No.: US 12,192,836 B2
(45) Date of Patent: *Jan. 7, 2025

(54) CELL MANAGEMENT METHOD AND APPARATUS, DEVICE AND STORAGE MEDIUM

(71) Applicant: ZTE CORPORATION, Shenzhen (CN)

(72) Inventors: Li Yang, Shenzhen (CN); He Huang, Shenzhen (CN); Jing Liu, Shenzhen (CN); Mengjie Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 327 days.

This patent is subject to a terminal disclaimer.

(21) Appl. No.: 17/783,420

(22) PCT Filed: Dec. 31, 2020

(86) PCT No.: PCT/CN2020/141982
§ 371 (c)(1),
(2) Date: Jun. 8, 2022

(87) PCT Pub. No.: WO2021/196799
PCT Pub. Date: Oct. 7, 2021

(65) Prior Publication Data
US 2023/0035119 A1    Feb. 2, 2023

(30) Foreign Application Priority Data
Apr. 2, 2020   (CN) .................. 202010256549.2

(51) Int. Cl.
*H04W 36/00*   (2009.01)
*H04W 36/08*   (2009.01)
(Continued)

(52) U.S. Cl.
CPC ... *H04W 36/0069* (2018.08); *H04W 36/0027* (2013.01); *H04W 36/0064* (2023.05);
(Continued)

(58) Field of Classification Search
CPC . H04B 7/02–12; H04B 17/0082–3913; H04W 8/005–245; H04W 16/02–32;
(Continued)

(56) References Cited

U.S. PATENT DOCUMENTS

2015/0092750 A1   4/2015   Huang et al.
2015/0271713 A1   9/2015   Kim et al.
(Continued)

FOREIGN PATENT DOCUMENTS

CN   106068658 A   11/2016
CN   107006055     8/2017
(Continued)

OTHER PUBLICATIONS

3GPP Technical Specification Group Radio Access Network. "Evolved Universal Terrestrial Radio Access Network X2 Application Protocol," Mar. 2020, pp. 1-79.
(Continued)

*Primary Examiner* — Timothy J Weidner
(74) *Attorney, Agent, or Firm* — Vivacqua Crane, PLLC

(57) ABSTRACT

A cell management method and apparatus, a device and a non-transitory computer-readable storage medium are disclosed. The method may include: sending a first dual-connection control message to a second communication node, where the first dual-connection control message is used for instructing the second communication node to manage related information of a conditional candidate target PSCell; and receiving the related information of the conditional candidate target PSCell sent by the second communication node.

19 Claims, 7 Drawing Sheets

Send a dual connection control message to a second communication node, where the first dual connection control message is used to instruct the second communication node to manage relevant information of a conditional candidate target primary secondary cell (PSCell) — S11

Receive relevant information of the conditional candidate target PSCell sent by the second communication node — S12

(51) Int. Cl.

| | |
|---|---|
| *H04W 36/36* | (2009.01) |
| *H04W 72/044* | (2023.01) |
| *H04W 72/27* | (2023.01) |
| *H04W 76/15* | (2018.01) |
| *H04W 76/30* | (2018.01) |
| *H04W 84/02* | (2009.01) |
| *H04W 88/08* | (2009.01) |
| *H04W 88/12* | (2009.01) |
| *H04W 92/02* | (2009.01) |
| *H04W 92/12* | (2009.01) |
| *H04W 92/20* | (2009.01) |

(52) U.S. Cl.
CPC ..... *H04W 36/00698* (2023.05); *H04W 36/08* (2013.01); *H04W 36/362* (2023.05); *H04W 72/044* (2013.01); *H04W 72/27* (2023.01); *H04W 76/15* (2018.02); *H04W 76/30* (2018.02); *H04W 84/02* (2013.01); *H04W 88/08* (2013.01); *H04W 88/12* (2013.01); *H04W 92/02* (2013.01); *H04W 92/12* (2013.01); *H04W 92/20* (2013.01)

(58) Field of Classification Search
CPC ..... H04W 24/02–10; H04W 28/02–26; H04W 36/0005–385; H04W 48/02–20; H04W 60/005–06; H04W 72/02–569; H04W 76/10–50; H04W 84/02–16; H04W 88/02–12; H04W 92/02–24
See application file for complete search history.

(56) References Cited

U.S. PATENT DOCUMENTS

| | | | | |
|---|---|---|---|---|
| 2018/0014229 | A1 | 1/2018 | Chiba et al. | |
| 2018/0279193 | A1 | 9/2018 | Park et al. | |
| 2022/0167233 | A1* | 5/2022 | Shi | H04W 36/00698 |
| 2022/0217586 | A1* | 7/2022 | Yang | H04W 36/00698 |
| 2022/0330106 | A1* | 10/2022 | Awada | H04W 36/00698 |
| 2022/0369172 | A1* | 11/2022 | Hwang | H04W 36/00698 |
| 2022/0369173 | A1* | 11/2022 | Deng | H04W 36/00692 |
| 2023/0097891 | A1* | 3/2023 | Zhang | H04W 36/0069 |
| 2023/0111427 | A1* | 4/2023 | Zhang | H04W 36/362 |
| 2023/0171652 | A1* | 6/2023 | Zhang | H04W 36/362 |
| 2023/0413153 | A1* | 12/2023 | Zhang | H04W 36/362 |
| 2024/0147340 | A1* | 5/2024 | Zhang | H04W 36/362 |

FOREIGN PATENT DOCUMENTS

| | | | |
|---|---|---|---|
| CN | 109788517 | A | 5/2019 |
| CN | 110519777 | A | 11/2019 |
| CN | 110611580 | A | 12/2019 |
| CN | 111901839 | A | 11/2020 |
| WO | 2019028747 | A1 | 2/2019 |
| WO | 2019194729 | A1 | 10/2019 |
| WO | 2020030378 | A1 | 2/2020 |
| WO | 2020031122 | A1 | 2/2020 |

OTHER PUBLICATIONS

3GPP Technical Specification Group Radio Access Network. "TP for TS36426 BLCR Conditional SN Addition & Change Procedure," 3GPP TSG-RAN WG3 Meeting #106, Nov. 2019, pp. 1-77.
Japan Patent Office. Notice of Reasons for Refusal for JP Application No. 2022-532146 and English translation, mailed Jun. 16, 2023, pp. 1-11.
3GPP Technical Specification Group Radio Access Network. "Report on Email Discussion [107b#52] [NR MobE] Open Issues Conditional PSCell Addition/Change," 3GPP TSG-RAN WG2 Meeting #108, Nov. 2019, pp. 1-46.
3GPP Technical Specification Group Radio Access Network. "TP for TS37.340 BLCR Conditional PScell&SCG Management in MR-DC," 3GPP TSG-RAN WG3 Meeting #105bis, Oct. 2019, pp. 1-17.
European Patent Office. Extended European Search Report for EP Application No. 20929156.6, mailed Apr. 12, 2024, pp. 1-12.
International Searching Authority. International Search Report and Written Opinion for PCT Application No. PCT/CN2020/141982 and English translation, mailed Mar. 22, 2021, pp. 1-11.
3GPP Technical Specification Group Radio Access Network. "Discussion on PCI confusing in case of Pscell change due to Pcell change," R3-191248, 3GPP TSG-RAN WG3 Meeting #103bis, Apr. 2019, pp. 1-3.
The State Intellectual Property Office of People's Republic of China. Office Action and Search Report for CN Application No. 202010256549.2 and English translation, mailed Oct. 8, 2024, pp. 1-33.

* cited by examiner

CELL MANAGEMENT METHOD AND APPARATUS, DEVICE AND STORAGE MEDIUM

CROSS-REFERENCE TO RELATED APPLICATION

This application is a national stage filing under 35 U.S.C. § 371 of international application number PCT/CN2020/141982, filed Dec. 31, 2020, which claims priority to Chinese patent application No. 202010256549.2, filed on Apr. 2, 2020. The contents of these applications are incorporated herein by reference in their entirety.

TECHNICAL FIELD

The present disclosure relates to the field of wireless communication networks, for example, to a cell management method and apparatus, a device and a non-transitory computer-readable storage medium.

BACKGROUND

In different Multi-RAT Dual Connectivity (MR-DC) operations, A master node (MN) and a secondary node (SN) need to perform resource collaboration and pre-configuration management for the application of PSCell to solve a potential configuration conflict. Application of PSCell pre-configured locally on the SN side is still transparent to MN, resulting in the failure of relevant control and coordination between MN and SN.

SUMMARY

According to the present disclosure, a cell management method and apparatus, a device and a non-transitory computer-readable storage medium are provided.

According to some embodiments of the present disclosure, a cell management method is provided. The method, which is applied to a first communication node, may include: sending a first dual connection control message to a second communication node, where the first dual connection control message is used to instruct the second communication node to manage relevant information of a conditional candidate target primary secondary cell (PSCell); and receiving relevant information of the conditional candidate target PSCell sent by the second communication node.

According to some embodiments of the present disclosure, a cell management method is further provided. The method, which is applied to a second communication node, may include: sending a second dual connection control message to a first communication node, where the second dual connection control message is used to apply for/send relevant information of a conditional candidate target primary secondary cell (PSCell) from/to the first communication node.

According to some embodiments of the present disclosure, a cell management apparatus is further provided. The apparatus, configured at a first communication node, may include: a first sending module, configured to send a first dual connection control message to a second communication node, where the first dual connection control message is used to instruct the second communication node to manage relevant information of a conditional candidate target primary secondary cell (PSCell); and a first receiving module, configured to receive relevant information of the conditional candidate target PSCell sent by the second communication node.

According to some embodiments of the present disclosure, a cell management apparatus is further provided. The apparatus, configured at a second communication node, may include: a second sending module, configured to send a second dual connection control message to a first communication node, where the second dual connection control message is used to apply for/send relevant information of a conditional candidate target primary secondary cell (PSCell) from/to the first communication node.

According to some embodiments of the present disclosure, a device is further provided, including: at least one processor; and a memory, configured to store at least one program. The at least one program, when executed by the at least one processor, causes the at least one processor to implement any of the cell management methods in the embodiments of the present disclosure.

According to some embodiments of the present disclosure, a non-transitory computer-readable storage medium is further provided. The non-transitory computer-readable storage medium stores a computer program which, when executed by a processor, causes the processor to implement any of the cell management methods in embodiments of the present disclosure.

DETAILED DESCRIPTION

Figure 1:
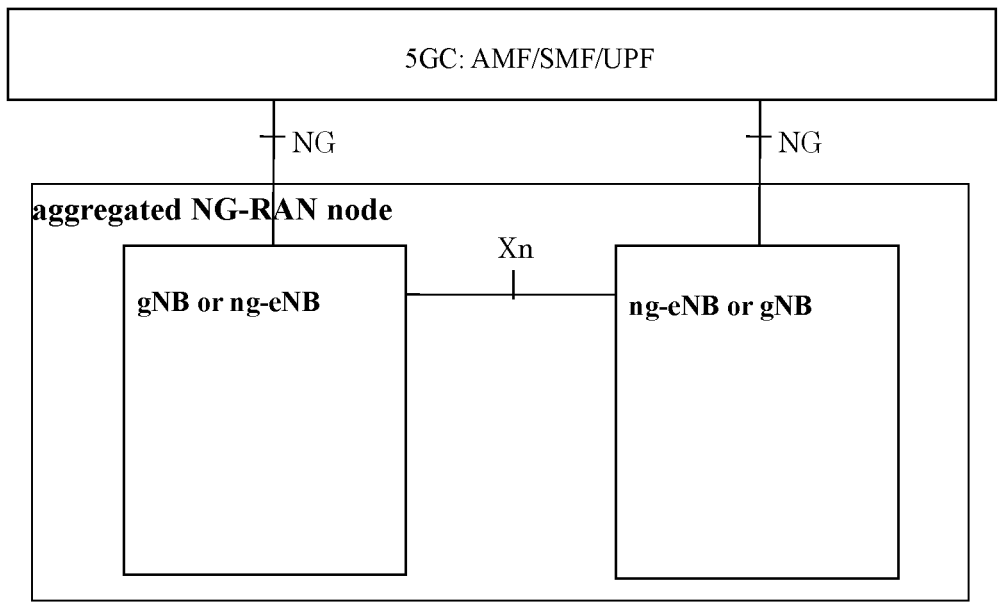
FIG. 1 is an architecture diagram of an aggregated NG-RAN node without separation of the air interface protocol stack of the centralized unit (CU)/distributed unit (DU)

Embodiments of the present disclosure will be described below in conjunction with the accompanying drawings.

Steps illustrated in the drawings, may be executed in a form of a set of instructions in a computer system. Also, although a logical order is shown in the flowchart, in some cases, the steps shown or described may be performed in a different order than as shown herein.

First, an application environment of the present disclosure is briefly introduced.

As the continuous development of the 4th Generation Long Term Evolution (4G LTE) land-based cellular mobile communication system, 5G LTE land-based cellular mobile communication system includes two subsystems: the 5th Generation Core (5GC) and the Next Generation Radio Access Network (NG-RAN). 5GC includes network entities or nodes such as Access Mobility Function (AMF) node, Session Management Function (SMF) node and User Plane Function (UPF) node. The NG-RAN includes at least two types of nodes with different Radio Access Technology (RAT), that is, the ng-eNB (the air interface still supports the Evolved Universal Terrestrial Radio Access Network (E-UTRA) RAT system) that continues to evolve smoothly based on the 4G evolved NodeB (eNB), and the gNB (the air interface supports the New Radio (NR) RAT system) with a design of a new physical layer air interface, as well as the logical interface connection between the node entities of the relevant network elements.

NG-RAN nodes (gNB or ng-eNB) are connected to 5GC through standardized NG interfaces bidirectionally. The bidirectional connection includes NG-Control (NG-C) control plane connection (for signaling transmission) and NG-User (NG-U) user plane connection (for user data transmission), while NG-RAN nodes (gNB or ng-eNB) are connected to each other through Xn interfaces (including Xn-C control plane connection and Xn-U user plane connection).

Figure 2:
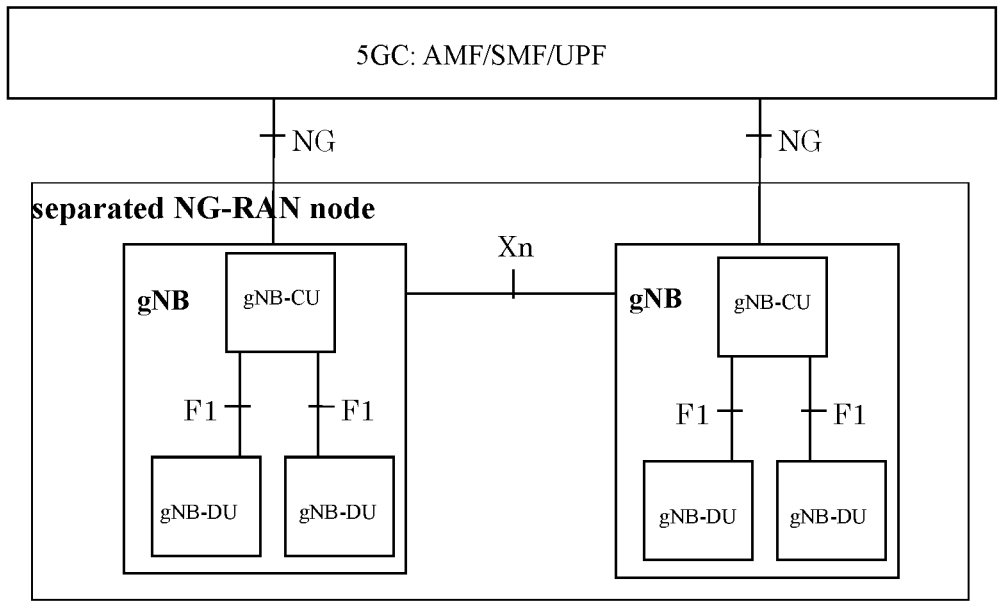
FIG. 2 is an architecture diagram of a separated NG-RAN node under the separation of gNB-CU/DU air interface protocol stack.

FIG. 1 is an architecture diagram of an aggregated NG-RAN node without separation of the air interface protocol stack of the CU/DU. FIG. 2 is an architecture diagram of a separated NG-RAN node under the separation of gNB-CU/DU air interface protocol stack. Taking the gNB-CU/DU separation supported by the 3rd Generation Partnership Project (3GPP) as an example, a single gNB is separated into a single gNB-CU and multiple gNB DU network node entities, which are connected bidirectionally through a standardized F1 interface, including F1-C control plane connection and F1-U user plane connection. The logical interfaces of gNB with sepatated CU/DU and of gNB/ng-eNB without sepatation of CU/DU are still NG and Xn interfaces. The control plane connection of the above network side logical interfaces (NG, Xn, F1) is used to transmit control signaling messages between network entities or nodes, while the user plane connection is used to transmit user service data (packets). NG Application Protocol (NGAP), XnAP and F1AP are the logical network application layer protocols of NG-C, Xn-C and F1-C control plane RNL (Radio Network Layer) respectively, which standardize the signaling process messages on each logical interface.

Before introducing the multi (dual) connection operation of network and the terminal user equipment (UE), a single connection operation is first introduced, that is, the terminal UE is served by only one serving node (such as eNB, ng-eNB or gNB) at a certain time and place. In the single connection operation of the terminal UE, the current NG-RAN service node maintains the continuity of the terminal user communication service (session) by the handover process. That is, the communication context of the terminal UE is smoothly migrated from the source node/cell to the target node/cell as far as possible. The handover process usually includes three stages: "handover preparation", "handover execution" and "handover completion". In the "handover preparation" stage, a source serving node cell (hereinafter referred to as the source node or source cell) and a target serving node cell (hereinafter referred to as the target node or target cell) negotiate based on the signaling process of the network logic interface to determine the reservation and configuration of the communication resources on the target side and the configuration content of the air interface handover command. In the "handover execution" stage, the source serving node cell sends an air interface handover command to the terminal UE in the Radio Resource Control (RRC) air interface signaling, so the UE attempts to perform the handover operation to a designated target node cell. In the "handover completion" stage, the source serving node cell and the target serving node cell negotiate the signaling process again to notify the handover result and release the communication resources and UE communication context that are no longer needed on the source side.

In the process of unconditional handover, the two stages of "handover preparation" and "handover execution" are continuous in time, that is, the time interval is small. The source cell starts the "handover preparation" process based on the wireless measurement report of the terminal UE and the local Radio Resource Management (RRM) strategy. After the designated target node cell (usually only one target master node and one target master service cell) completes resource reservation and configuration related to the "handover preparation" process on the target side, the source cell activates "handover execution" using the air interface, and the terminal UE executes the handover command to try to handover to the target node cell. Therefore, the "actual handover time point" of the terminal UE and the time point of receiving the air interface handover command are closely continuous in time. The air interface handover command sent by the source cell is usually sent to the UE when the terminal UE and the network side meet the "actual handover conditions" at the same time. Here, "actual handover condition" refers to that the wireless signal quality of the designated target node cell is good enough, the reserved communication resource is sufficient and the configuration is reasonable. After the UE is successfully handed over to the target node cell, at least part of the service continuity can be maintained.

The above unconditional handover mechanism is originally designed for the deployment of low-frequency non-dense cells. With the expansion of network evolution capacity, heterogeneous networks (HetNet) are also deployed on the homogeneous network. For example, many small cells are also deployed within the coverage of cellular macro cells. In 5G system, in addition to using low-frequency band resources, high-frequency band resources up to 100 GHz will also be used. These high-frequency cells may only be deployed in small cell clusters in the form of dense small cells. Under the above background and new requirements, conditional handover (CHO) is introduced into 3GPP standard. In the process of conditional handover, "CHO handover preparation" and "CHO handover execution" are greatly separated in time, that is, a large time interval is allowed therebetween. Based on the wireless measurement report of the terminal UE and local RRM strategy, the source cell starts the "CHO handover preparation" process, requests multiple potential/candidate target node/cells to complete the target side resource reservation configuration related to the "CHO handover preparation" process, and sends the CHO pre-configuration information to the UE in advance through an air interface RRC reconfiguration signaling. Then, the source cell does not immediately activate the "CHO handover execution", and the terminal UE does not immediately perform CHO handover to a suitable target node cell. Instead, the terminal UE perform CHO handover to a suitable target node cell until a UE locally evaluates that the "actual handover conditions" are met later. Therefore, the "actual handover time" of the terminal UE and the receipt time of the air interface CHO handover command are discontinuous in time. Through the CHO mechanism, the source cell can reserve and configure resources for multiple target side (cell) in advance when the source side wireless link is in good condition (such as non cell edge). The terminal UE selects the most appropriate target cell to perform handover according to the local dynamic situation, so as to reduce the probability of handover failure and improve the user's mobile service experience, and the like.

Figure 3:
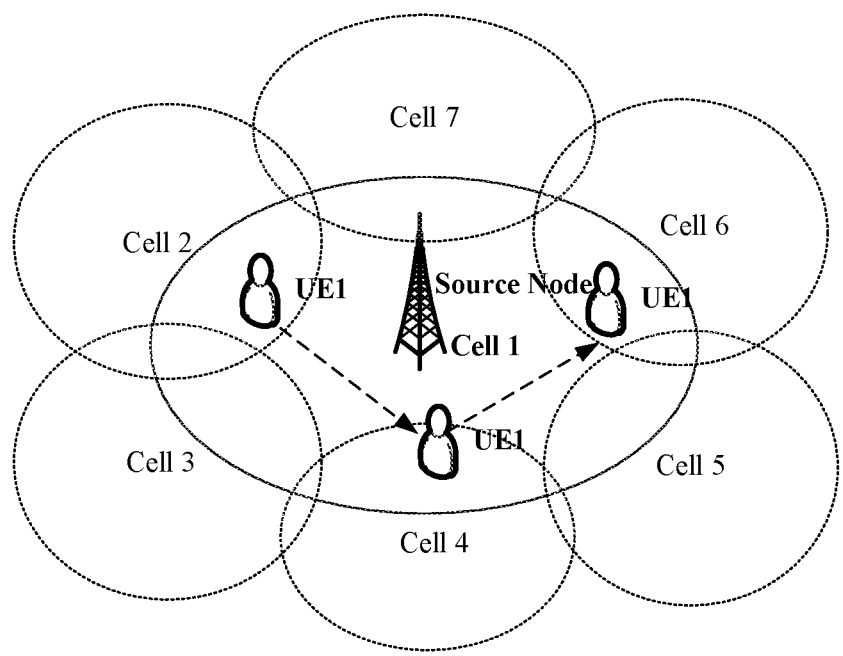
FIG. 3 is a schematic diagram of conditional handover preconfigured resource management under a single node.

FIG. 3 is a schematic diagram of conditional handover preconfigured resource management under a single node. As shown in FIG. 3, a source node governs local cells of Cell1, Cell2, Cell3, Cell4, Cell5, Cell6 and Cell7. Cell1 is a current primary service cell of a terminal UE1. With the undirected movement of UE1, adjacent cells of Cell2, Cell3, Cell4, Cell5, Cell6 and Cell7 may become potential/candidate target cells of UE1, Therefore, in order to enhance the mobile robustness and improve the user experience, the source node may pre-configure the Cell2/3/4/5/6/7 cells as the candidate target cells of the UE through the CHO mechanism. When the UE1 subsequently locally evaluates that the "actual handover conditions" are met during the movement, the UE1 will perform the CHO handover to the target cell that meets the CHO conditions. When CHO involves operations across different nodes, the source node needs to conduct CHO pre-configuration negotiation and "CHO handover preparation" with adjacent nodes based on the interface signaling process.

Figure 4:
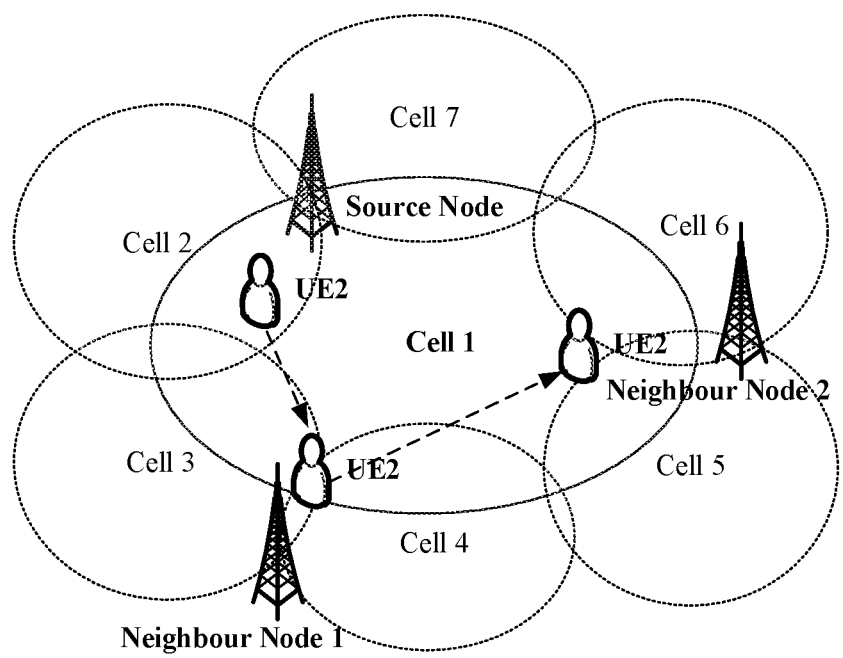
FIG. 4 is a schematic diagram of conditional handover preconfigured resource management across nodes.

FIG. 4 is a schematic diagram of conditional handover preconfigured resource management cross nodes. As shown in FIG. 4, a source node governs local cells of Cell1, Cell2 and Cell7, while Neighbor node1 and Neighbor node2 respectively govern local cells of Cell3, Cell4 and local cells of Cell5 and Cell6. Cell1 is a current primary service cell of a terminal UE2. With the non-directional movement of UE2, Cell2, Cell3, Cell4, Cell5, Cell6 and Cell7 may also become the potential/candidate target cells of the UE2. Therefore, in order to enhance the mobile robustness, the source node can pre-configure Cell3, Cell4, Cell5 and Cell6 as the candidate target cells of the UE through the CHO mechanism. For the above candidate target cells, in addition to the "CHO addition (initial pre-configuration)" operation related to each potential/candidate target cell, there are also "CHO modification (re-preconfiguration)" and "CHO release (or pre-configuration cancel, deletion)" operations. "CHO addition" and "CHO modification" operations are to make the CHO mechanism work, because the target node cell can reserve and configure relevant communication resources for the UE. The "CHO release" (or CHO cancel/deletion) operation greatly affects the work efficiency of the CHO mechanism and the occupation of system resources, as when a pre-configured candidate target cell becomes no longer suitable (for example, the UE has gradually moved away from the target cell, and subsequent access is unlikely, or local load congestion occurs in that cell), the node should release/cancel/delete the target cell in time. The terminal UE no longer locally evaluates whether the target cell meets the "actual handover conditions" and is no longer ready to perform CHO handover to the target cell.

Figure 5:
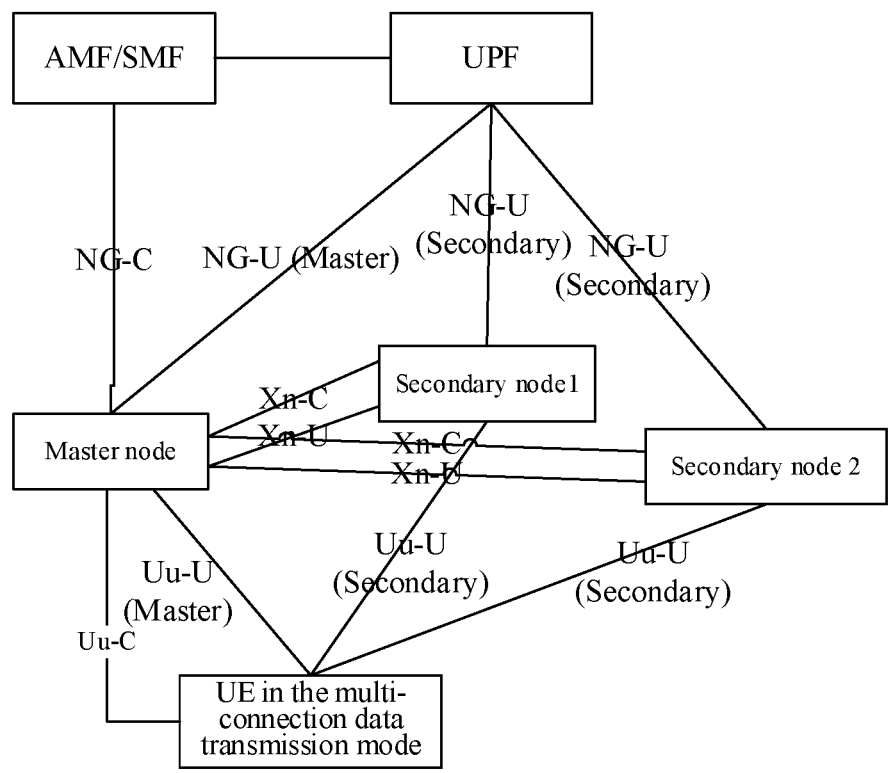
FIG. 5 is a schematic diagram of NG-RAN multi-connection operation and architecture.

Under the multi (dual) connection operation of the network and the terminal, the terminal UE can be served by two or more serving nodes at the same time. FIG. 5 is a schematic diagram of NG-RAN multi-connection operation and architecture. As shown in FIG. 5, the terminal UE may simultaneously connect with the only master node (MN: master control anchor node, which determines the RRC state of the terminal, and has NG-C control plane connection with the 5GC) and two secondary nodes (SN: data diversion node, which is controlled by the master node, and has NG-U user plane connection with the 5GC). An air interface Uu Radio Link (RL) is respectively established and maintained therefore, and meanwhile uplink and downlink transmission of the user service data is conducted.

Figure 6:
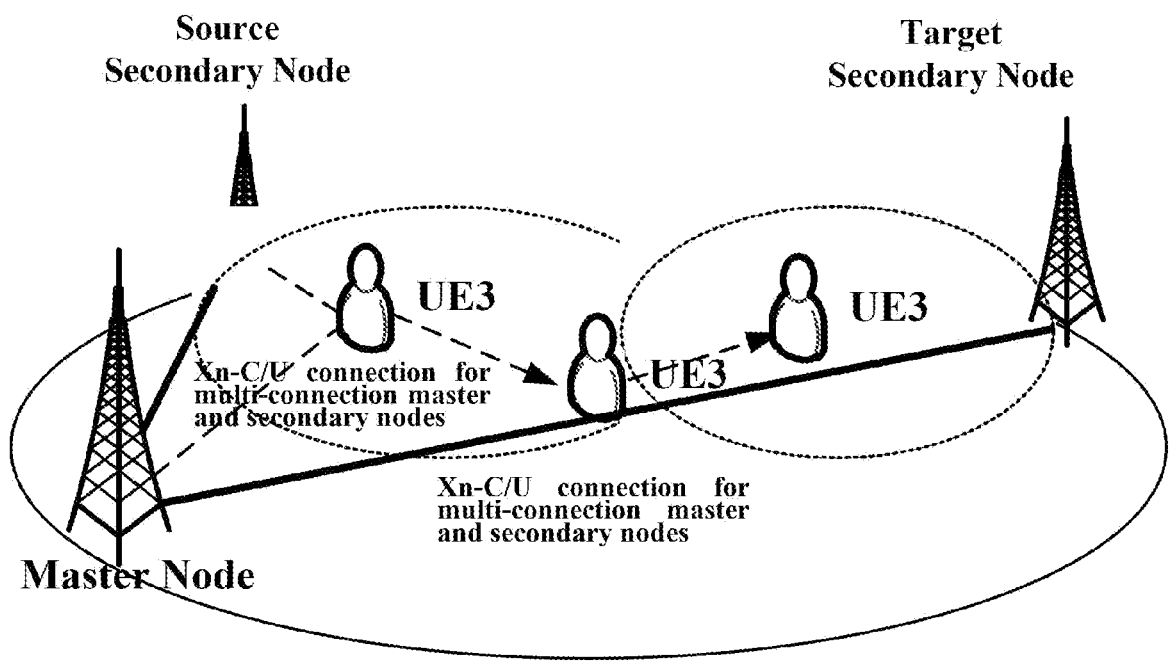
FIG. 6 is a schematic diagram of a moveable scene in which the secondary node changes under the multi-connection operation.

In the 4G E-UTRA system, the master and secondary nodes may be the master eNB (MeNB) and the secondary gNB (SgNB). In the 5G NG-RAN system, the master and secondary nodes may be gNB or ng-eNB, which independently allocate and schedule radio resources for the served terminal UE. As the terminal UE moves, the master node may change and migrate (that is, the UE moves from an old coverage of the source master node to a new coverage of the target master node). In this case, the mobility management of the primary cell/master cell group (Pcell/MCG) on the side of the master node is carried out through the traditional HO or CHO mobility process under the above single connection operation. In addition, there is a unique mobile scenario for multi-connection operation. As the terminal UE moves, the master mode (MN) or the current service Pcell/MCG connected with the terminal UE remains unchanged, while the secondary node (SN) or the primary secondary cell (PSCell)/secondary cell group (SCG) in the current service SN changes (that is, the UE moves from an old coverage of the source SN to a new coverage of the target new SN under the coverage of the same MN, or from the old PSCell/SCG coverage of the current service SN to the new coverage of the target new PSCell/SCG). MCG is the master service cell group always bound with the Pcell, while SCG is the secondary service cell group always bound with the PSCell. FIG. 6 is a schematic diagram of a moveable scene in which the secondary node changes under the multi-connection operation. As shown in FIG. 6, UE3 is originally under the joint coverage of the master node and the source secondary node for dual connection operation. When UE3 moves to the target new secondary node, UE3 will enter under the joint coverage of an anchor master node and the target new secondary node. In this case, it is necessary to use the traditional SN change or conditional SN change mobile process under multi (dual) connection operation to manage the mobility of the service cell on the side of the secondary node. If the secondary node of the service remains unchanged and only the PSCell changes, it is necessary to use PSCell or conditional PSCell change mobile process for management.

When the UE is in the multi (dual) connection operation, both the master node and the source secondary node currently in service may pre-configure the candidate target secondary node/cell-candidate PSCell/SCG on the secondary node side and manage the related addition, modification and release. The principle is similar to the CHO mechanism under the above single connection. In this case, the UE does not immediately access the candidate target secondary node/cell-candidate PSCell/SCG on the secondary node side. Instead, access is not attempted until the UE locally evaluates that the "actual conditions" are met. After successful access, the candidate target secondary node/cell takes effect and provides radio link services. The candidate target secondary node/cell directed to the secondary node side is provided with the operation of "candidate PSCell/SCG addition (initial pre-configuration)", as well as the basic operations of "candidate PSCell/SCG modification (reset pre-configuration)" and "candidate PSCell/SCG release (or cancel, delete pre-configuration)" under different scenarios of "Inter-SN" or "Intra-SN". The present disclosure will realize the collaborative management of one or more candidate PSCells/SCGs between the master and secondary nodes, which can effectively reduce the reservation or occupation of relevant communication resources for a long time, or the conflict of conditional pre-configuration and usage between the master and secondary nodes, and realize the timely recycling, reuse and collaboration of communication resources.

Both the UE and the master and secondary nodes support the pre-configuration of the conditional PSCell/SCG change (hereinafter referred to as CPC) under the related multi (dual) connection operation in the present disclosure, the moveable scenario and the related process mechanism. The UE may move across coverage of different "Inter-SN" or "Intra-SN" PSCells/SCGs. When the UE is about to or has been in multi (dual) connection operation, radio link services for the UE is provided by at least one serving master node and one source serving secondary node. The description of dual connection (DC) operation is focused in the following for simplification. The mechanism and principle of multi-connection operation are similar, and the logical method will be expanded accordingly.

Figure 7:
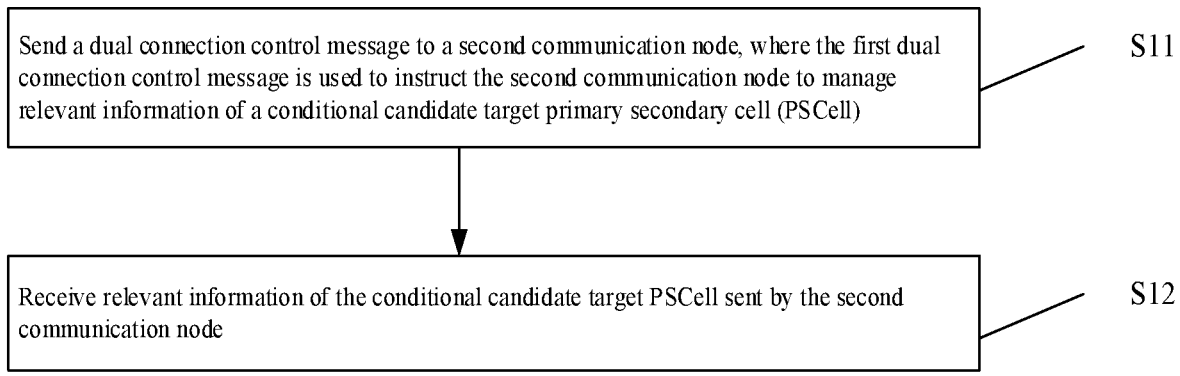
FIG. 7 is a schematic flowchart of a cell management method according to the present disclosure.

In an implementation, a cell management method is provided. FIG. 7 is a schematic flowchart of a cell management method according to the present disclosure. The method can be applied to the case of cooperative management of candidate target cells under multi (dual) connection operation. The method is applied to a first communication node. The method may be executed by a cell management apparatus according to the present disclosure, and the cell management apparatus may be implemented by software and/or hardware.

As shown in FIG. 7, the cell management method according to the embodiment of the present disclosure mainly includes steps S11 and S12.

At S11, a first dual connection control message is sent to the second communication node, where the first dual connection control message is used to instruct the second communication node to manage relevant information of a conditional candidate target primary secondary cell (PSCell).

At S12, the relevant information of the conditional candidate target PSCell sent by the second communication node is received.

In the embodiment, both the first communication node and the second communication node may be nodes. A node may be a device capable of communicating with a user terminal. The node can be any device with wireless transceiver function. In an embodiment, the first communication node is a master node and the second communication node is a secondary node.

In the embodiment of the present disclosure, the user terminal is a device with wireless transceiver function, which can be deployed on land, including indoor or outdoor, handheld, wearable or vehicle-mounted. The user terminal may also be deployed on the water surface (such as ships), and may also be deployed in the air (such as aircraft, balloons and satellites). The user terminal may be a mobile phone, a pad, a computer with wireless transceiver function, a virtual reality (VR) terminal, an augmented reality (AR) terminal, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, and the like. The embodiment of the present disclosure does not limit the application scenario. User terminals may sometimes be called as terminals, access terminals, UE units, UE stations, mobile stations, remote stations, remote terminals, mobile devices, UE terminals, wireless communication devices, UE agents or UE devices, which are not limited in the embodiments of the present disclosure.

In an implementation, the first dual connection control message includes one or more of a query message, a pre-configuration message and a release message.

In the embodiment, the type of the first dual connection control message may be different depending on the type of node. The message type of the first dual connection control message may refer to the message type in the subsequent application example scheme of the present disclosure, which will not be repeated here.

In an implementation, the first dual connection control message is carried by a secondary node addition request signaling, or the first dual connection control message is carried by a secondary node modification request signaling.

In an implementation, sending the first dual connection control message to the second communication node includes sending a query message to the second communication node, where the query message is used to query relevant information of the conditional candidate target PSCell in the currently serving second communication node.

In an implementation, the relevant information of the conditional candidate target PSCell includes one or more of the following: a cell global identifier (CGI) of the conditional candidate target PSCell; a cell carrier frequency of the conditional candidate target PSCell; a bandwidth of the conditional candidate target PSCell; a physical cell identifier (PCI) of the conditional candidate target PSCell; a total number of the conditional candidate target PSCells allowed on a plurality of carrier frequencies; a total number of the conditional candidate target PSCells pre-configured and allowed in the second communication node.

In an implementation, the relevant information of the conditional candidate target PSCell change includes: attribute class indication information of the conditional candidate target PSCell.

In an implementation, the attribute class indication information refers to an attribute class indication indicating whether the conditional candidate target PSCell can be applied for release, cancellation or deletion by the first communication node.

The above "the relevant information of candidate target secondary cell-candidate PSCell/SCG" includes the attribute class indication indicating whether these cells can be applied for release/cancellation/deletion by MN.

In an implementation, sending of the first dual connection control message to the second communication node includes: sending a first pre-configuration message to the second communication node, where the first pre-configuration message is used to limit a pre-configured maximum number of the conditional candidate target PSCells in the currently serving second communication node.

In an implementation, the maximum number is the maximum total number of conditional candidate target PSCells of the second communication node at all carrier frequencies; or, the maximum number is the local maximum number of conditional candidate target PSCells of the second communication node at a certain carrier frequency.

In an implementation, the second communication node is prohibited from locally pre-configuring any conditional candidate target PSCell in the case of the maximum number being a preset value.

If the above "maximum number" is 0, it means that the SN is not intend to pre-configure any candidate target secondary cell-candidate PSCell/SCG locally.

In an implementation, sending the first dual connection control message to the second communication node includes: sending a first release message to the second communication node, where the first release message is used to instruct the second communication node to release, delete or cancel one or more conditional candidate target PSCells designated in the current serving second communication node.

In an implementation, the conditional candidate target PSCell to be released, deleted or cancelled is indicated by one or more of the following information: a cell global identifier (CGI) of the conditional candidate target PSCell; a cell carrier frequency of the conditional candidate target PSCell; a bandwidth of the conditional candidate target PSCell; a physical cell identifier (PCI) of the conditional candidate target PSCell; and the number of the conditional candidate target PSCells in the second communication node to be released, deleted or cancelled by the second communication node.

Figure 8:
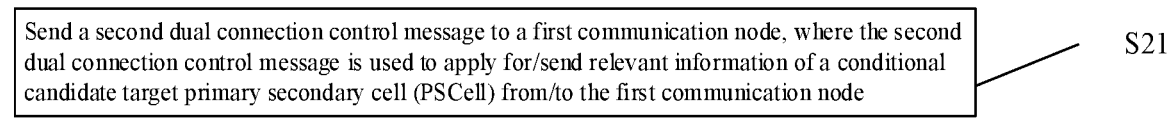
FIG. 8 is a schematic flowchart of a cell management method according to the present disclosure.

In an implementation, a cell management method is provided. FIG. 8 is a schematic flowchart of a cell management method according to the present disclosure. This method may be applied to the case of cooperative management of candidate target cells under multi (dual) connection operation. The method is applied to a second communication node. The method can be executed by the cell management apparatus according to the present disclosure, and the cell management apparatus can be implemented by software and/or hardware.

As shown in FIG. 8, the cell management method according to the embodiment of the present disclosure mainly includes step S21.

At S21, a second dual connection control message is sent to the first communication node, where the second dual connection control message is used to apply for/send relevant information of the conditional candidate target PSCell from/to the first communication node.

In the embodiment, sending the second dual connection control message to the first communication node may include, sending by the second communication node, the second dual connection control message to the first communication node after receiving the first dual connection control message sent by the first communication node; or actively sending by the second communication node, the second dual connection control message to the first communication node.

The second dual connection control message includes one or more of a notification message, a pre-configuration message and a release message.

In an implementation, the second dual connection control message is carried by a secondary node modification request signaling.

In an implementation, sending the second dual connection control message to the first communication node includes: actively sending a notification message to the first communication node, where the notification message is used to actively inform the first communication node of relevant information of conditional candidate target PSCells within a currently serving second communication node.

The relevant information of the conditional candidate target PSCell includes one or more of the following: a cell global identifier (CGI) of the conditional candidate target PSCell; a cell carrier frequency of the conditional candidate target PSCell; a bandwidth of the conditional candidate target PSCell; a physical cell identifier (PCI) of the conditional candidate target PSCell; a total number of the conditional candidate target PSCells allowed on a plurality of carrier frequencies; and a total number of the conditional candidate target PSCells pre-configured and allowed in the second communication node.

In an implementation, the relevant information of the conditional candidate target PSCell change includes: attribute class indication information of the conditional candidate target PSCell.

The above "relevant information of candidate target secondary cells-candidate PSCell/SCG" includes the attribute class indication indicating whether these cells can be applied for release/cancellation/deletion by MN.

In an implementation, sending the second dual connection control message to the first communication node includes: sending a second pre-configuration message to the first communication node, where the second pre-configuration message is used for applying for a pre-configured maximum allowable number of the conditional candidate target PSCells in the currently serving second communication node from the first communication node.

The maximum number is the maximum total number of conditional candidate target PSCells of the second communication node at all carrier frequencies; or, the maximum number is the local maximum number of conditional candidate target PSCells of the second communication node at a certain carrier frequency.

In the case of the maximum number being a preset value, the second communication node is prohibited from locally pre-configuring any conditional candidate target PSCell.

If the above "maximum number" is 0, it means that the secondary node is not intend to pre-configure any candidate target secondary cell-candidate PSCell/SCG locally.

In an implementation, sending the second dual connection control message to the first communication node includes: sending a second release message to the first communication node, where the second release message is used to inform the first communication node of one or more conditional candidate target PSCells designated in the currently serving second communication node to be released, deleted or cancelled and relevant resources.

The conditional candidate target PSCell to be released, deleted or cancelled is indicated by one or more of the following information: a cell global identifier (CGI) of the conditional candidate target PSCell; a cell carrier frequency of the conditional candidate target PSCell; a bandwidth of the conditional candidate target PSCell; a physical cell identifier (PCI) of the conditional candidate target PSCell;

and the number of conditional candidate target PSCells in the second communication node to be released, deleted or cancelled by the second communication node.

Figure 9:
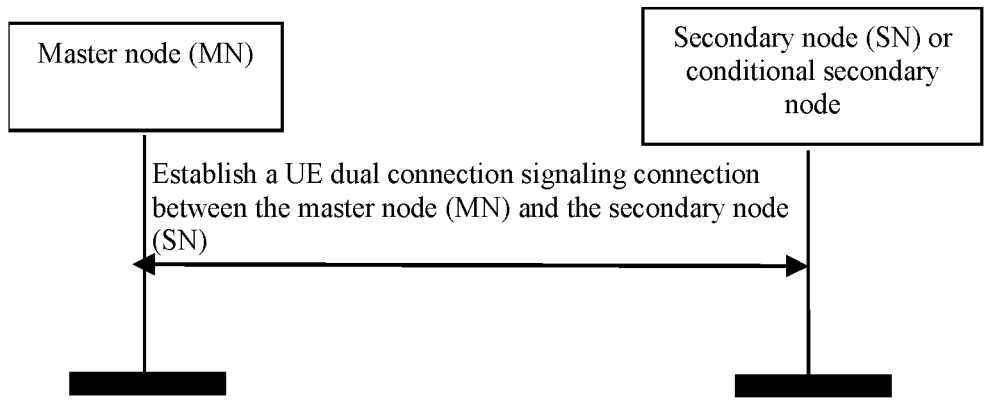
FIG. 9 is a schematic diagram of a small collaborative management scenario of master and secondary service cells in a conditional candidate target cell.

The scheme of the application is applied to the management of master and secondary services in the conditional candidate target cell. FIG. 9 is a schematic diagram of a small cooperative management scenario of master and secondary service cells in a conditional candidate target cell. As shown in FIG. 9, the UE is currently under the dual connection operation of simultaneous MN and SN services or preconfigured services. A UE dual connection signaling transmission is established between the master node (MN) and the secondary node (SN).

In an application example, a method of sending query information from the MN to the SN is provided.

The MN initiates an information query process to the SN, which is used to obtain situation of the candidate target secondary cell-candidate PSCell/SCG in the current serving SN.

The MN requests the SN in service to inform relevant information of one or more candidate target secondary cells-candidate PSCell/SCG that the SN has preconfigured, via the existing SN addition request/SN addition acknowledgement or SN modification request/SN modification acknowledgement signaling process between the MN and the SN.

The above "relevant information of candidate target secondary cell-candidate PSCell/SCG" may include, but not limited to, a cell global ID (CGI), a cell carrier frequency and bandwidth, a physical cell ID (PCI), a total number of pre-configured candidate PSCells on each carrier frequency or all the pre-configured candidate PSCells, and the like.

The above "relevant information of candidate target secondary cell-candidate PSCell/SCG" includes: the attribute class indication indicating whether the cells can be applied for release/cancellation/deletion by the MN.

The MN initiates a pre-configuration process to the SN for the purpose of limiting the maximum number of candidate target secondary cells-candidate PScells/SCGs in the current serving SN.

The MN informs the serving SN of the maximum number of candidate target secondary cells-candidate PSCells/SCGs that can be pre-configured locally by the SN through the existing SN addition request/acknowledgement or SN modification request/acknowledgement signaling process between the MN and SN.

The above "maximum number" may be the maximum total number on all local carrier frequencies of SN, or the local maximum number on a certain carrier frequency of SN.

If the above "maximum number" is 0, it means that MN prohibits SN from pre-configuring any candidate target secondary cell-candidate PSCell/SCG locally.

The MN initiates the release of candidate target secondary cells to the secondary node for the purpose of applying for the release/cancellation/deletion of candidate target secondary cells-candidate PScells/SCGs in the current serving SN.

The MN requests the serving SN to release/cancel/delete one or more local candidate target secondary cells-candidate PSCells/SCGs and related resources through the existing SN release request/acknowledgement or SN modification request/acknowledgement signaling process between the MN and SN.

The candidate target secondary cells-candidate PSCells/SCGs to be released/cancelled/deleted by SN may be indicated by a cell global identifier (CGI), or a cell carrier frequency and bandwidth, or a physical cell ID (PCI), or the number of candidate PSCells to be released by SN.

In an application example, a method of sending information from a secondary node (SN) to a master node (MN) is provided.

The SN initiates an information exchange process to the MN for the purpose of actively informing the MN of the situation of the candidate target secondary cells-candidate PSCells/SCGs in the current serving SN.

The SN actively informs the MN of the relevant information of one or more candidate target secondary cells-candidate PSCells/SCGs that has been preconfigured by the SN through the existing SN modification required/confirm signalling process between the MN and SN.

The above "relevant information of candidate target secondary cells-candidate PSCells/SCGs" may include, but not limited to: a cell global ID (CGI), a cell carrier frequency and bandwidth, a physical cell ID (PCI), a total number of pre-configured candidate PSCells on each carrier frequency point or all the pre-configured candidate PSCells, and the like.

The above "relevant information of candidate target secondary cells-candidate PSCells/SCGs" includes the attribute class indication indicating whether these cells can be applied for release/cancellation/deletion by MN.

The SN initiates a pre-configuration process to the MN for the purpose of applying for the maximum number of candidate target secondary cells-candidate PScells/SCGs in the current serving SN.

The SN applies to the MN the maximum number of candidate target secondary cells-candidate PSCells/SCGs allowed to be preconfigured locally by the SN through the existing SN modification required/confirm signalling process between the MN and SN.

The above "maximum number" may be the maximum total number on all local carrier frequencies of SN, or the local maximum number on a certain carrier frequency of SN.

If the above "maximum number" is 0, it means that SN is not intended to preconfigure any candidate target secondary cell-candidate PSCell/SCG locally.

The SN initiates the release of candidate target secondary cells to the MN in order to actively release/cancel/delete the candidate target secondary cells-candidate PSCells/SCGs in the current serving SN.

Through the existing SN release required/confirm or SN modification required/confirm signaling process between the MN and SN, the SN informs MN that SN is about to release/cancel/delete one or more local candidate target secondary cells-candidate PSCells/SCGs and related resources.

The candidate target secondary cells-candidate PSCells/SCGs to be released/cancelled/deleted by the SN may be indicated by a cell global ID (CGI), or a cell carrier frequency and bandwidth, or a physical cell ID (PCI), or the number of candidate PSCells to be released by the SN.

Figure 10:
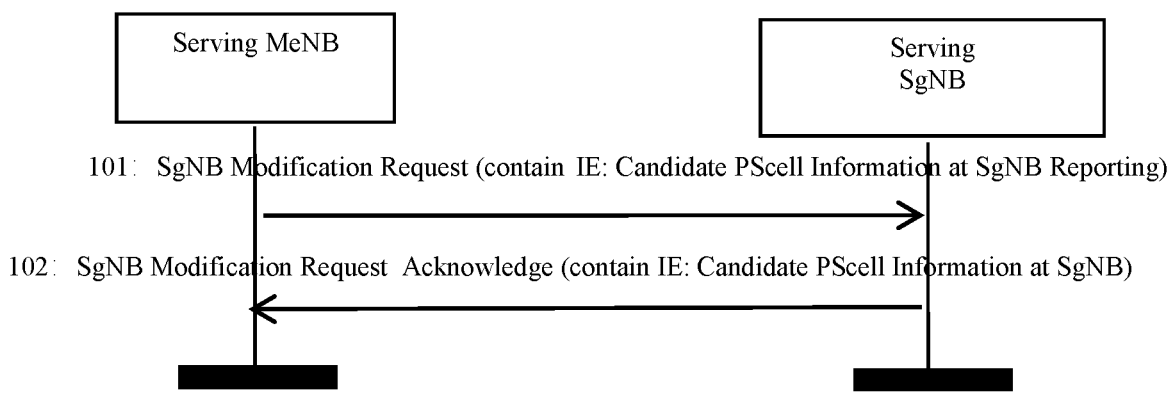
FIG. 10 is a schematic flowchart of interaction between master and secondary nodes.

In an application example, a method for information interaction between the master node (MeNB) and the secondary node (SgNB) is provided when the UE is already in E-UTRA NR-DC (EN-DC) operation. As shown in FIG. 10, a UE is already in EN-DC dual connection operation, that is, the UE has been wirelessly connected to MeNB and the SgNB, and a UE associated signaling connection has been established via the X2 interface to transmit relevant process signaling of the UE dual connection. At first, SgNB selects and locally pre-configures two candidate target secondary service cells (groups) PSCell1/SCG1 and PSCell2/SCG2 according to the SCG configuration auxiliary information provided by MeNB. The two candidate target secondary service cells (groups) may have different carrier frequencies and different operating bandwidths. MeNB doesn't know about the pre-configured candidate PSCell on the SgNB side.

At S101, MeNB sends a special message of X2AP: secondary node modification request to SgNB for query, where the SgNB modification request includes information element (IE): candidate PSCell information at SgNB reporting replied by SgNB, which is used to request SgNB to inform MeNB of the locally pre-configured candidate PSCell.

At S102, SgNB replies an associated message of X2AP: SgNB modification request acknowledgement to MeNB. The SgNB modification request acknowledgement contains information element (IE): candidate PSCell information at SgNB, and is to inform MeNB of the candidate PSCell information configured locally and currently on the SgNB side, that is, NR CGI (NCGI) identification of PSCell1 and PSCell2 and respective carrier frequency and bandwidth information. Further, the SgNB modification request acknowledgement is to inform PScell1 cannot be applied for release/cancellation/deletion by MeNB, while PScell2 can be applied for release/cancellation/deletion by MeNB.

MeNB is informed of the current pre-configured candidate PSCell on the SgNB side, so as to provide reference and preparation for the subsequent resource coordination and reconfiguration between the MeNB and SgNB.

Figure 11:
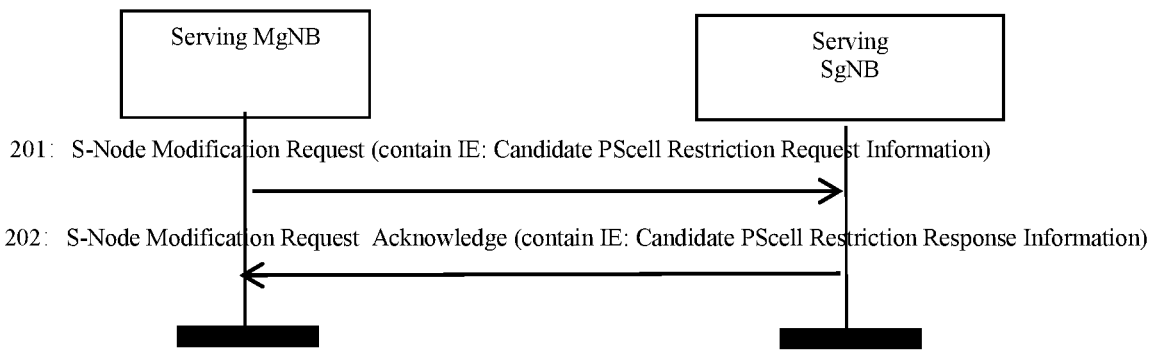
FIG. 11 is a schematic flowchart of interaction between master and secondary nodes.

In an application example, as shown in FIG. 11, a UE is already in operation of Nr-DC@5GC, that is, the UE has been wirelessly connected to the MgNB and the SgNB. The UE associated signaling connection has been established via the Xn interface to transmit the relevant process signaling of the UE dual connection. Initially, SgNB selects and locally pre-configures three candidate target secondary service cells (groups) PSCell1/SCG1, PSCell2/SCG2 and PSCell3/SCG13 according to the SCG configuration auxiliary information provided by MgNB. The candidate target secondary service cells (groups) may have different carrier frequencies and different carrier bandwidths. Through the previous XnAP process, MgNB has known the current pre-configured candidate PSCells on the SgNB side, but expects SgNB to reduce the total number of candidate PSCells.

At S201, MgNB sends a special message of XnAP: S-node modification request to SgNB, where the S-node modification request contains an IE: candidate PSCell restriction request information, which is used to inform SgNB of the maximum number (for example, 2) of candidate PSCells allowed to be preconfigured locally in the future.

At S202, SgNB selects and decides to release/cancel/delete PSCell3/SCG3, and SgNB replies to MgNB an associated message of XnAP: SgNB modification request acknowledgement. The SgNB modification request acknowledgement contains an IE: candidate PSCell restriction response information, and is to informe MgNB that SgNB side agrees to retain up to two candidate PSCells locally, that is, PSCell3/SCG3 will be released/cancelled/deleted, while PSCell1/SCG1, PSCell2/SCG2 will be retained.

MgNB is informed of the updated pre-configured candidate PSCell on the SgNB side, so as to provide reference and preparation for the subsequent resource coordination and reconfiguration between the MgNB and SgNB.

Figure 12:
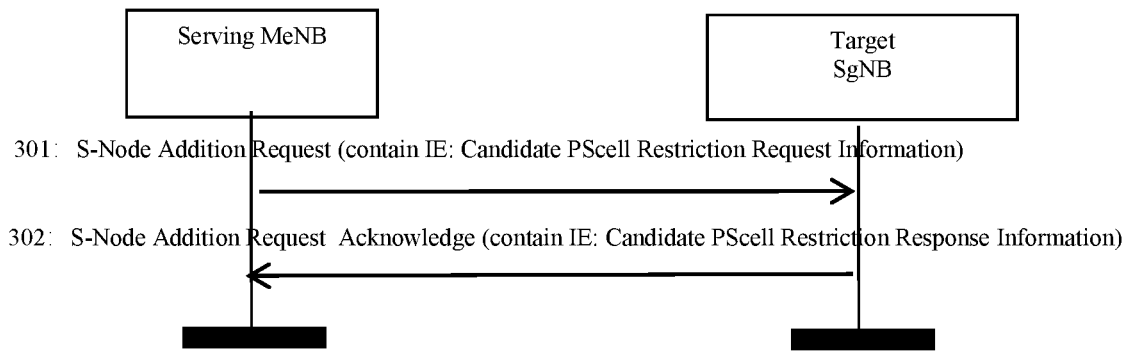
FIG. 12 is a schematic flowchart of interaction between master and secondary nodes.

In an application example, as shown in FIG. 12, a single connection operation UE is about to enter NG-RAN EN-DC@5GC (NGEN-DC@5GC) Operation, and the UE will be wirelessly connected to the master node MeNB and the candidate target secondary node SgNB. The UE associated signaling connection will be established via the Xn interface to transmit the relevant process signaling of the UE dual connection. Initially, several candidate Pcells/MCGs have been pre-configured locally on the MeNB side for CHO operation, but it is not expected that CPC operation is performed in parallel on the SgNB side, that is, the maximum number of candidate PSCells pre-configured locally on the SgNB side is 0.

At S301, MeNB sends an associated message of XnAP: S-node addition request to SgNB, where the S-node addition request contains an IE: candidate PSCell restriction request information, which is used to inform that the maximum number of candidate PSCells allowed to be preconfigured locally by SgNB is 0, that is, SgNB is prohibited from CPC operation.

At S302, SgNB selects and determines the PSCell1/SCG1 currently serving the UE according to the SCG configuration auxiliary information provided by MeNB, and SgNB replies to MeNB with an associated message of XnAP: SgNB addition request acknowledgement. The SgNB addition request acknowledgement contains an IE: candidate PSCell restriction response information, and is to inform MeNB that the local side of SgNB has learned that any candidate PSCell will not be pre-configured conditionally in the future. That is, only PSCell1/SCG1 currently serving UE is configured.

Then the UE enters the dual connection operation of NGEN-DC@5GC, Thereafter, any candidate PSCell is not conditionally pre-configured locally on the SgNB side, and the CPC operation is not performed.

Figure 13:
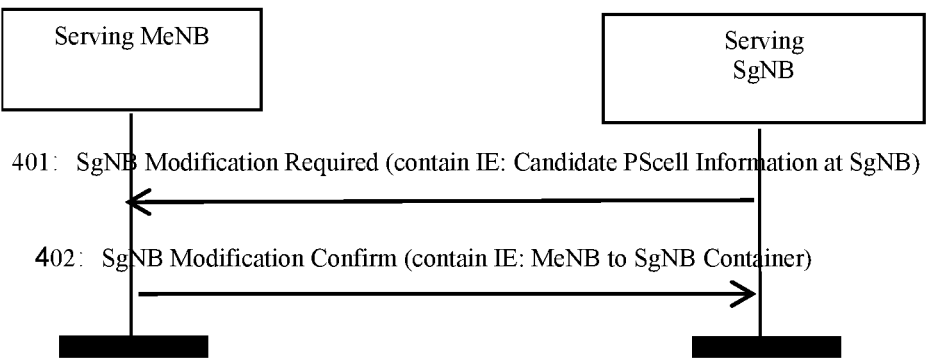
FIG. 13 is a schematic flowchart of interaction between master and secondary nodes.

In an example, as shown in FIG. 13, a UE is already in EN-DC dual connection operation, that is, the UE has been wirelessly connected to the MeNB and SgNB. The UE associated signaling connection has been established via the X2 interface to transmit the relevant process signaling of the UE dual connection. SgNB reconfigures two candidate target secondary service cells (groups) PSCell3/SCG3 and PSCell4/SCG4 according to the latest SCG configuration auxiliary information and local RRM measurement information provided by MeNB. The candidate target secondary service cells (groups) may have different carrier frequencies and different operating bandwidths. MeNB doesn't know about the conditionally pre-configured candidate PSCells at the SgNB side after update.

At S401, SgNB sends an associated message of X2AP: SgNB modification required to MeNB, where the SgNB modification required contains an IE: candidate PSCell information at SgNB, which is used to actively inform MeNB of the preconfigured candidate PSCell information after local update on the SgNB side, that is, the NCGI identification of PSCell3 and PSCell4 and respective carrier frequency and bandwidth information. In addition, PSCell3 cannot be applied for release/cancellation/deletion by MeNB, and PSCell4 can be applied for release/cancellation/deletion by MeNB.

At S402, MeNB replies to SgNB an associated message of X2AP: SgNB modification confirm, where the SgNB modification confirm contains an IE: MeNB to SgNB container, which is used to inform SgNB of subsequent SCG reconfiguration auxiliary information, and the like.

MeNB is informed of the conditionally pre-configured candidate PSCells after update on the SgNB side, so as to provide reference and preparation for the subsequent resource coordination and reconfiguration between MeNB and SgNB.

Figure 14:
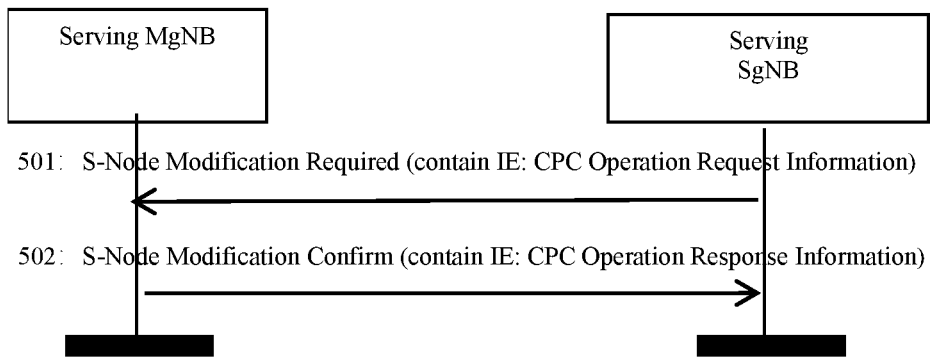
FIG. 14 is a schematic flowchart of interaction between master and secondary nodes.

In an application example, as shown in FIG. 14, a UE is already in operation of Nr-DC@5GC, that is, the UE is currently wirelessly connected to the MgNB and the SgNB.

The UE associated signaling connection has been established via the Xn interface to transmit the relevant process signaling of the UE dual connection. Initially, MgNB prohibits SgNB from performing local CPC operation, that is, SgNB is not allowed to pre-configure any candidate PSCell. SgNB wants to perform local CPC operation later according to the local RRM measurement information, such as pre-configuring a candidate target secondary service cell (Group) PSCell5/SCG5 conditionally.

At S501, SgNB sends an associated message of XnAP: S-node modification required to MgNB, where the S-node modification required contains an IE: CPC operation request information, and applies to MgNB for the maximum number (for example, 1) of candidate PSCells/SCGs that SgNB is allowed to pre-configure locally.

At S502, MgNB replies to SgNB an associated message of XnAP: S-node modification confirm, where the S-node modification confirm contains an IE: CPC operation response information, which is used to inform SgNB to confirm the maximum number of candidate target secondary cells/SCGs that SgNB is allowed to pre-configure locally in the future.

SgNB learns that the maximum number of candidate target secondary cells/SCGs that can be preconfigured locally is 1, so as to provide reference and preparation for pre-configuring a candidate target secondary cell PSCell5/SCG5.

Figure 15:
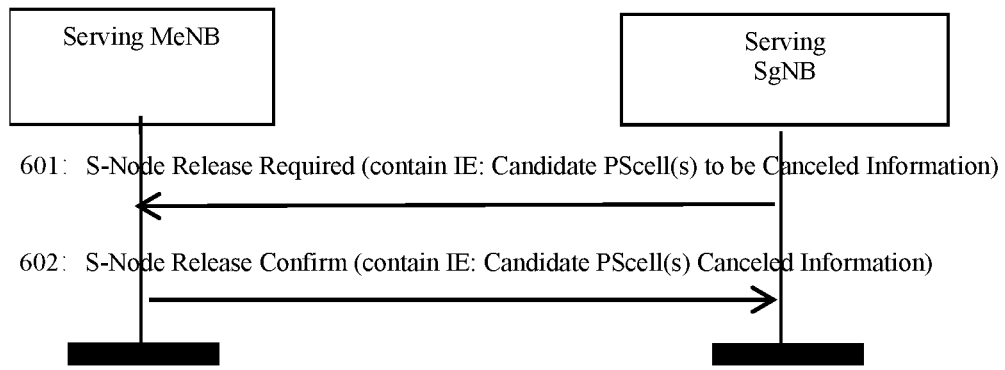
FIG. 15 is a schematic flowchart of interaction between master and secondary nodes.

In an application example, as shown in FIG. 15, a UE is already in operation of NGEN-DC@5GC, that is, the UE has been wirelessly connected to the MeNB and the SgNB. The UE associated signaling connection has been established via the Xn interface to transmit the relevant process signaling of UE dual connection. Initially, SgNB has pre-configured two candidate target secondary service cells (groups) PSCell1/SCG1 and PSCell2/SCG2. Then, SgNB wants to actively release/cancel/delete the relevant resources of local PSCell2/SCG2.

At S601, SgNB sends an associated message of XnAP: S-node release required to MeNB, where the S-node release required contains an IE: candidate PSCell(s) to be cancelled information to inform MeNB that the SgNB side will actively release/cancel/delete the relevant resources of local PSCell2/SCG2.

At S602, MeNB replies to SgNB an associated message of XnAP: S-node release confirm, where the S-node release confirm contains an IE: candidate PSCell(s) cancelled information, which is used to inform SgNB that MeNB has confirmed to know that the relevant resources of the local PSCell2/SCG2 is released/canceled/deleted on the SgNB side.

MeNB is informed of the current pre-configured candidate PSCell after update on the SgNB side, leaving only PSCell1/SCG1, so as to provide reference and preparation for the subsequent resource coordination and reconfiguration between the MeNB and SgNB.

Figure 16:
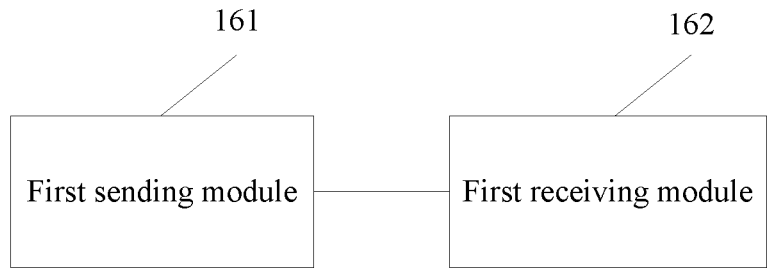
FIG. 16 is a schematic structural diagram of a cell management apparatus according to the present disclosure.

In an implementation, a cell management apparatus is provided. FIG. 16 is a schematic structural diagram of a cell management apparatus according to the present disclosure. The apparatus can be applied to the case of cooperative management of candidate target cells under multi (dual) connection operation. The apparatus is configured at a first communication node. The cell management apparatus may be implemented by software and/or hardware.

As shown in FIG. 16, the cell management apparatus according to the embodiment of the present disclosure mainly includes a first sending module 161 and a first receiving module 162.

The first sending module 161 is configured to send a first dual connection control message to a second communication node, where the first dual connection control message is used to instruct the second communication node to manage relevant information of a conditional candidate target primary secondary cell (PSCell).

The first receiving module 162 is configured to receive the relevant information of the conditional candidate target PSCell sent by the second communication node.

In an implementation, the first dual connection control message includes one or more of a query message, a pre-configuration message and a release message.

In an implementation, the first dual connection control message is carried by a secondary node addition request signaling, or the first dual connection control message is carried by a secondary node modification request signaling.

In an implementation, the first sending module 161 is configured to send a query message to the second communication node, where the query message is used to query relevant information of a conditional candidate target PSCell in a currently serving second communication node.

In an implementation, the relevant information of the conditional candidate target PSCell includes one or more of the following: a cell global identifier (CGI) of the conditional candidate target PSCell; a cell carrier frequency of the conditional candidate target PSCell; a bandwidth of the conditional candidate target PSCell; a physical cell identifier (PCI) of the conditional candidate target PSCell; a total number of the conditional candidate target PSCells allowed on a plurality of carrier frequency points; and a total number of the conditional candidate target PSCells pre-configured and allowed in the second communication node.

In an implementation, the relevant information of conditional candidate target PSCell change includes: attribute class indication information of the conditional candidate target PSCell.

The attribute class indication information refers to the attribute class indication indicating whether the conditional candidate target cell PSCell can be applied for release, cancellation or deletion by the first communication node.

In an implementation, the first sending module 161 is configured to send a first pre-configuration message to the second communication node, where the first pre-configuration message is used to limit a pre-configured maximum number of conditional candidate target PSCells in the currently serving second communication node.

In an implementation, the maximum number is the maximum total number of the conditional candidate target PSCells of the second communication node at all carrier frequencies; or, the maximum number is the local maximum number of the conditional candidate target PSCells of the second communication node of the secondary node (SN) at a certain carrier frequency.

In an implementation, the second communication node is prohibited from locally pre-configuring any conditional candidate target PSCell in the case of the maximum number being a preset value.

In an implementation, the first sending module 161 is configured to send a first release message to the second communication node, where the first release message is used to instruct the second communication node to release, delete or cancel one or more conditional candidate primary secondary cells (PSCells) designated in the currently serving second communication node.

In an implementation, the conditional candidate target PSCell to be released, deleted or cancelled is indicated by one or more of the following information: the cell global identifier (CGI) of the conditional candidate target PSCell; the cell carrier frequency of the conditional candidate target PSCell; the bandwidth of the conditional candidate target PSCell; the physical cell identifier (PCI) of the conditional candidate target PSCell; and the number of conditional candidate target PSCells in the second communication node to be released, deleted or cancelled by the second communication node.

The cell management apparatus provided in the embodiment can execute the cell management method provided in any embodiment of the present disclosure, and has the corresponding functional modules and effects of executing the method. For the technical details not described in detail in the embodiment, please refer to the cell management method provided in any embodiment of the present disclosure.

In the embodiment of the above cell management apparatus, the units and modules included are only divided according to the functional logic, but are not limited to the above division, as long as the corresponding functions can be realized. In addition, the names of the functional units are only for mutual distinction and are not intended to limit the scope of protection of the present disclosure.

Figure 17:
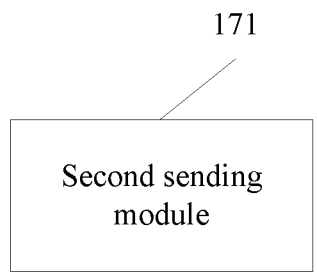
FIG. 17 is a schematic structural diagram of a cell management apparatus according to the present disclosure.

In an implementation, a cell management apparatus is provided. FIG. 17 is a schematic structural diagram of a cell management apparatus according to the present disclosure. The apparatus can be applied to the case of cooperative management of candidate target cells under multi (dual) connection operation. The apparatus is configured at a second communication node. The cell management apparatus may be implemented by software and/or hardware.

As shown in FIG. 17, the cell management apparatus according to the embodiment of the present disclosure mainly includes a second sending module 171.

The second sending module 171 is configured to send a second dual connection control message to a first communication node, where the second dual connection control message is used to apply for/send relevant information of conditional candidate target PSCell from/to the first communication node.

In an implementation, the second dual connection control message includes one or more of a notification message, a pre-configuration message and a release message.

In an implementation, the second dual connection control message is carried by a secondary node modification request signaling.

In an implementation, the second sending module 171 is configured to actively send a notification message to the first communication node, where the notification message is used to actively inform the first communication node of relevant information of the conditional candidate target PSCell in a currently serving second communication node.

In an implementation, the second sending module 171 is configured to send a second pre-configuration message to the first communication node, where the second pre-configuration message is used for applying for a pre-configured maximum allowable number of the conditional candidate target PSCells in the currently serving second communication node from the first communication node.

In an implementation, the second sending module 171 is configured to send a second release message to the first communication node, where the second release message is used to inform the first communication node that the one or more conditional candidate target PSCells designated in the currently serving second communication node and relevant resources are to be released, deleted or cancelled.

The cell management apparatus provided in the embodiment can execute the cell management method provided in any embodiment of the present disclosure, and has the corresponding functional modules and effects of executing the method. For the technical details not described in detail in the embodiment, please refer to the cell management method provided in any embodiment of the present disclosure.

In the embodiment of the above cell management apparatus, the units and modules included are only divided according to the functional logic, but are not limited to the above division, as long as the corresponding functions can be realized. In addition, the names of the functional units are only for mutual distinction and are not intended to limit the scope of protection of the application.

Figure 18:
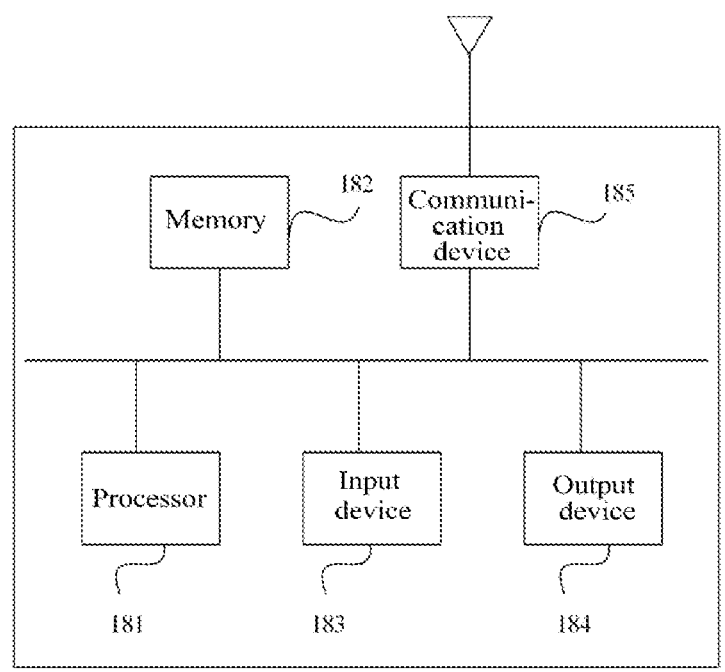
FIG. 18 is a schematic structural diagram of a device according to the embodiment of the present disclosure.

According to the embodiment of the present disclosure, a device is further provided. FIG. 18 is a schematic structural diagram of a device according to the embodiment of the present disclosure. As shown in FIG. 18, the device includes a processor 181, a memory 182, an input device 183, an output device 184 and a communication device 185. The number of the processor 181 in the apparatus may be one or more, and one processor 181 is taken as an example in FIG. 18. The processor 181, memory 182, input device 183 and output device 184 in the device can be connected through bus or other means. In FIG. 18, the connection through bus is taken as an example.

As a computer-readable storage medium, the memory 182 may be used to store software programs, computer executable programs and modules, such as program instructions/modules corresponding to the cell management method in the embodiment of the present disclosure (for example, the first sending module 161 and the first receiving module 162 in the cell management apparatus). Another example is the program instructions/modules corresponding to the cell management method in the embodiment of the present disclosure (for example, the second sending module 171 in the cell management apparatus). The software programs, instructions and modules stored in the memory 182, when executed by the processor 181, cause the processor 181 to execute various functional applications and data processing of the apparatus, that is, to realize any cell management method according to the embodiment of the present disclosure.

The memory 182 may mainly include a program storage area and a data storage area for data. The program storage area may store application programs required for an operating system and at least one function, and the data storage area may store data created according to the use of the device. In addition, the memory 182 may include a high-speed random access memory and a nonvolatile memory, such as at least one disk memory device, flash memory device, or other nonvolatile solid-state memory devices. In some examples, the memory 182 may include a memory remotely located with respect to the processor 181, which may be connected to the device via a network. Examples of the network include, but are not limited to, the Internet, Intranet, Local Area Network (LAN), mobile communication network and combinations thereof.

The input device 183 may be used to receive input digital or character information and generate key signal input related to user setting and function control of the device. The output device 184 may include a display device such as a display screen.

The communication device 185 may include a receiver and a transmitter. The communication device 185 is configured to receive and transmit information according to the control of the processor 181.

In the case of the device being the first communication node, the processor 181 runs programs stored in the system memory 182 to execute various functional applications and data processing, for example, to implement the cell management method according to the embodiment of the present disclosure. The method includes: sending a first dual connection control message to a second communication node, where the first dual connection control message is used to instruct the second communication node to manage relevant information of a conditional candidate target primary secondary cell (PSCell); and receiving relevant information of the conditional candidate target PSCell sent by the second communication node.

The processor 111 may also implement the technical scheme of the cell management method according to any embodiment of the present disclosure. The hardware structure and function of the device may refer to the content of the embodiment.

In the case of the device being the second communication node, the processor 181 runs programs stored in the system memory 182 to execute various functional applications and data processing, for example, to implement the cell management method according to the embodiment of the present disclosure. The method includes: sending a second dual connection control message to a first communication node, where the second dual connection control message is used to apply for/send relevant information of a conditional candidate target PSCell from/to the first communication node.

The processor 610 may also implement the technical scheme of the cell management method according to any embodiment of the present disclosure. The hardware structure and function of the device may refer to the content of the embodiment.

In an implementation, a storage medium containing computer executable instructions is further provided, where the computer executable instructions, when executed by a computer processor, cause the computer processor to perform a cell management method. The method is applied to a first communication node, including: sending a first dual connection control message to a second communication node, where the first dual connection control message is used to instruct the second communication node to manage relevant information of a conditional candidate target primary secondary cell (PSCell); and receiving relevant information of the conditional candidate target PSCell sent by the second communication node.

In the storage medium containing computer executable instructions according to the embodiment of the present disclosure, the computer executable instructions are not limited to perform the method operations described above, but may also perform the relevant operations in the cell management method according to any embodiment of the present disclosure.

According to the embodiment of the present disclosure, a storage medium containing computer executable instructions is further provided, where the computer executable instructions, when executed by a computer processor, cause the computer processor to perform a cell management method. The method is applied to a second communication node, including: sending a second dual connection control message to a first communication node, where the second dual connection control message is used to apply for/send relevant information of a conditional candidate target PSCell from/to the first communication node.

In the storage medium containing computer executable instructions according to the embodiment of the present disclosure, the computer executable instructions are not limited to the method operations described above, but also can perform the relevant operations in the cell management method according to any embodiment of the present disclosure.

Through the above description of the embodiments, the present disclosure can be realized by means of software and necessary general hardware, or by hardware. The technical scheme of the present disclosure may be embodied essentially in the form of a software product, which may be stored in a computer-readable storage medium, such as a floppy disk, a Read-Only Memory (ROM), a Random Access Memory (RAM), a FLASH memory, a hard disk or an optical disk, etc., of a computer, including a number of instructions to enable a computer device (which may be a personal computer, a server, a network device, etc.) to execute the methods described in various embodiments of the present disclosure.

The term user terminal covers any suitable type of wireless user equipment, such as a mobile phone, a portable data processing device, a portable web browser, or an on-board mobile station.

In general, various embodiments of the present disclosure may be implemented in hardware or dedicated circuits, software, logic, or any combination thereof. For example, some aspects may be implemented in hardware, while others may be implemented in firmware or software that may be executed by a controller, a microprocessor or other computing devices, although the present disclosure is not limited thereto.

The embodiment of the present disclosure can be implemented through computer program instructions executed by a data processor of a mobile device, for example, in a processor entity, or through hardware, or through a combination of software and hardware. The computer program instructions may be assembly instructions, instruction set architecture (ISA) instructions, machine instructions, machine related instructions, microcode, firmware instructions, status setting data, or source code or object code written in any combination of one or more programming languages.

The block diagram of any logic flow in the drawings of the present disclosure may represent program steps, or interconnected logic circuits, modules and functions, or a combination of program steps and logic circuits, modules and functions. The computer program may be stored in the memory. The memory may be of any type suitable for the local technology environment and may be implemented using any suitable data storage technology, such as but not limited to, read only memory (ROM), random access memory (RAM), optical memory devices and systems (digital video disc (DVD) or compact disk (CD)), etc. The computer-readable medium may include a non-transient storage medium. The data processor may be of any type suitable for the local technology environment, such as but not limited to general-purpose computer, special-purpose computer, microprocessor, digital signal processing (DSP), application specific integrated circuit (ASIC), field programmable gate array (FPGA), and processor based on multi-core processor architecture.

The invention claimed is:

1. A cell management method, which is applied to a first communication node, comprising:

sending a first dual connection control message comprising a first pre-configuration message to a second communication node, wherein the first dual connection control message is used to instruct the second communication node to manage relevant information of a conditional candidate target primary secondary cell (PSCell); and receiving the relevant information of the conditional candidate target PSCell sent by the second communication node;

wherein the first pre-configuration message is used to limit a pre-configured maximum number of conditional candidate target PSCells within the second communication node in service.

2. The method of claim 1, wherein the first dual connection control message further comprises a query message, or a release message.

3. The method of claim 2, wherein sending the first dual connection control message to the second communication node comprises:

sending a query message to the second communication node, wherein the query message is used to the query relevant information of the conditional candidate target PSCell in the second communication node in service.

4. The method of claim 3, wherein the relevant information of the conditional candidate target PSCell comprises at least one of:

a cell global identifier (CGI) of the conditional candidate target PSCell;

a cell carrier frequency of the conditional candidate target PSCell;

a bandwidth of the conditional candidate target PSCell;

a physical cell identifier (PCI) of the conditional candidate target PSCell;

a total number of the conditional candidate target PSCells allowed on a plurality of carrier frequencies; and a total number of the conditional candidate target PSCells pre-configured and allowed in the second communication node.

5. The method of claim 2, wherein the relevant information of the conditional candidate target PSCell comprises:

attribute class indication information of the conditional candidate target PSCell.

6. The method of claim 5, wherein the attribute class indication information refers to an attribute class indication indicating whether the conditional candidate target PSCell can be applied for release, cancellation or deletion by the first communication node.

7. The method of claim 2, wherein sending the first dual connection control message to the second communication node comprises:

sending a first release message to the second communication node, wherein the first release message is used to instruct the second communication node to release, delete or cancel at least one conditional candidate target PSCell designated in the second communication node in service.

8. The method of claim 7, wherein the conditional candidate target PSCell to be released, deleted or cancelled is indicated by at least one of the following information:

a CGI of the conditional candidate target PSCell;

a cell carrier frequency of the conditional candidate target PSCell;

a bandwidth of the conditional candidate target PSCell;

a PCI of the conditional candidate target PSCell; and a number of conditional candidate target PSCells in the second communication node to be released, deleted or cancelled by the second communication node.

9. The method of claim 1, wherein the first dual connection control message is carried by a secondary node addition request signaling, or the first dual connection control message is carried by a secondary node modification request signaling.

10. The method of claim 1, wherein:

the maximum number is the maximum total number of the conditional candidate target PSCells of the second communication node at all carrier frequencies; or in response to the second communication node being a second communication node of a secondary node (SN), the maximum number is the maximum number of the conditional candidate target PSCells of the second communication node of the SN at a carrier frequency.

11. The method of claim 1, wherein the second communication node is prohibited from locally pre-configuring the conditional candidate target PSCell in response to the maximum number being a preset value.

12. A device, comprising:

at least one processor; and a memory, configured to store at least one program;

wherein the at least one program, when executed by the at least one processor, causes the at least one processor to carry out the cell management method of claim 1.

13. A non-transitory computer-readable storage medium storing a computer program which, when executed by a processor, causes the processor to carry out the cell management method of claim 1.

14. A cell management method, which is applied to a second communication node, comprising:

sending a second dual connection control message comprising a second pre-configuration message to a first communication node, wherein the second dual connection control message is used to apply for relevant information of a conditional candidate target primary secondary cell (PSCell) from the first communication node, or the second dual connection control message is used to send relevant information of a conditional candidate target primary secondary cell (PSCell) to the first communication node;

wherein the second pre-configuration message is used for applying for a pre-configured maximum number of the conditional candidate target PSCells within the second communication node in service from the first communication node.

15. The method of claim 14, wherein the second dual connection control message further comprises a notification message or a release message.

16. The method of claim 15, wherein sending the second dual connection control message to the first communication node comprises:

actively sending a notification message to the first communication node, wherein the notification message is used to actively inform the first communication node of relevant information of the conditional candidate target PSCell within the second communication node in service;

or sending a second release message to the first communication node, wherein the second release message is used to inform the first communication node of relevant resources of at least one conditional candidate target PSCell to be released, deleted or cancelled which is designated in the second communication node in service.

17. The method of claim 14, wherein the second dual connection control message is carried by a secondary node modification request signaling.

18. A device, comprising:
   at least one processor; and
   a memory, configured to store at least one program;
   wherein the at least one program, when executed by the at least one processor, causes the at least one processor to carry out the cell management method of claim 14.

19. A non-transitory computer-readable storage medium storing a computer program which, when executed by a processor, causes the processor to carry out the cell management method of claim 14.

* * * * *